May 8, 1934.　　　　　F. C. FRANK　　　　　1,957,637
BRAKE
Filed Dec. 21, 1931

INVENTOR.
FREDERICK C. FRANK
BY *O. H. Fowler*
ATTORNEYS.

Patented May 8, 1934

1,957,637

UNITED STATES PATENT OFFICE 1,957,637

BRAKE

Frederick C. Frank, South Bend, Ind., assignor to Bendix Aviation Corporation, South Bend, Ind., a corporation of Delaware Application December 21, 1931, Serial No. 582,448

2 Claims. (Cl. 188—78)

This invention relates to brakes and more particularly to internal expanding brakes and operating means therefor.

In the illustrated embodiment of the invention the friction element including two shoes, preferably made of an aluminum alloy casting, have their articulated ends connected by an adjusting means. One end of the friction element is pivoted on a fixed anchor, and the operating member pivoted on the anchor is connected by a link to the other end of the friction element. The structure is of such character that the shoes which are normally shaped to conform to the braking surface of the drum will under pressure prevent zones of extremely high pressure.

The structure also provides for transmitting the reaction of the input pressure to the anchor direct, thus reducing the total thrust on the anchor caused by the load on the secondary shoe and consequently eliminating anchor pin distortion.

An object of the invention is to provide a friction element including two shoes of an aluminum alloy casting adjustably connected and so operated that the shoes will conform to the braking surface of the drum under pressure and hence will prevent zones of high pressure.

Another object of the invention is to provide an efficient means for operating the friction element of a brake including a lever pivoted on an anchor and connected to the friction element by a thrust link.

A further object of the invention is to transmit the reaction of the input pressure direct to the anchor to reduce the total thrust on the anchor caused by the load of the secondary shoe and thereby eliminating anchor distortion.

A feature of the invention is an operating member having a bifurcated end pivoted on an anchor with one end of the friction element engaging the anchor between the bifurcations.

Another feature of the invention is a fixed anchor, an operating lever having a bifurcated end pivoted on the anchor, a friction element having one end engaging the anchor between the bifurcations, and a link connecting the other end of the friction element to the lever.

The above and other objects and features of the invention including various and desirable details of structure will be apparent from the following description taken in connection with the drawing forming a part of this specification, and in which.

Figure 1:
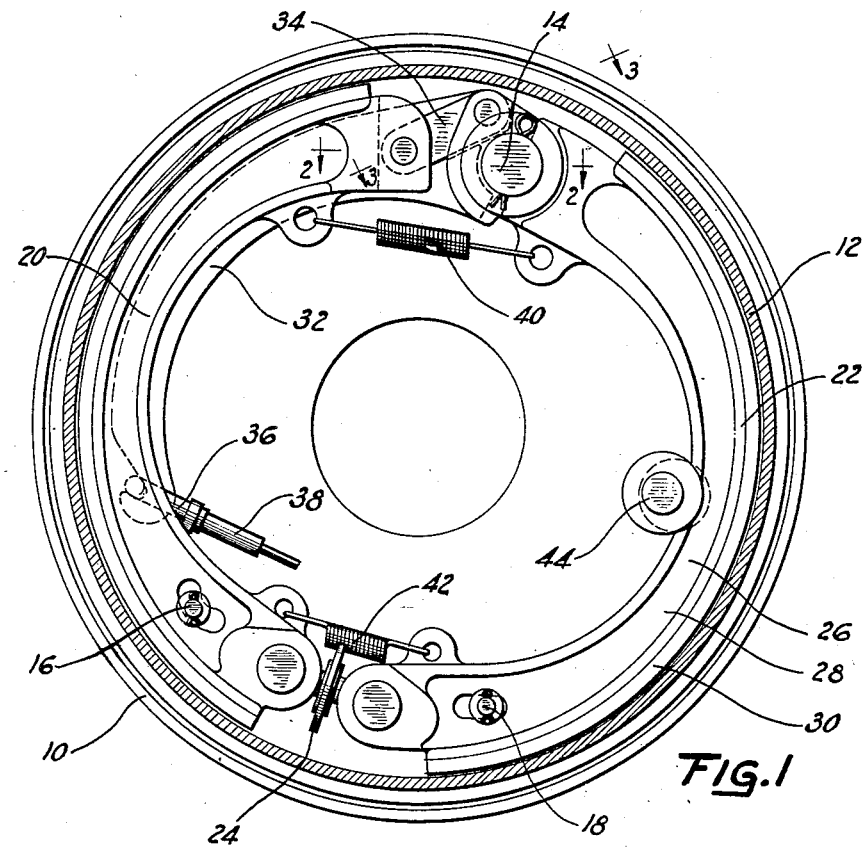
Figure 1 is a vertical sectional view of a brake taken just back of the head of the drum showing the friction elements and operating means in side elevation.
Figure 2:
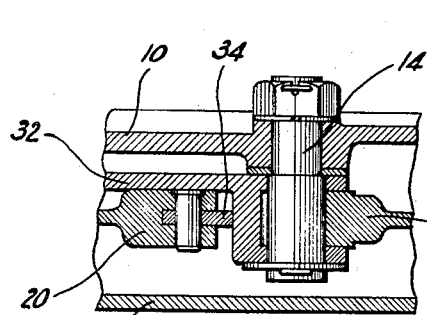
Figure 2 is a sectional view substantially on the line 2—2, Figure 1.
Figure 3:
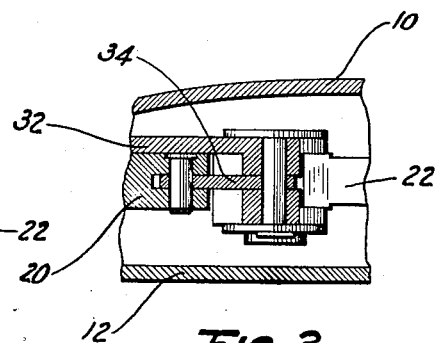
Figure 3 is a sectional view on the line 3—3, Figure 1.

Referring to the drawing for more specific details of the invention, 10 represents a fixed support such as a backing plate. The backing plate has associated therewith a rotatable drum 12. Positioned on the backing plate is an anchor 14 and suitable steady rests 16 and 18. The backing plate has positioned thereon for movement a friction element including a primary shoe 20 and a secondary shoe 22 connected at their articulated ends by a suitable adjusting device 24.

These shoes are preferably made of aluminum alloy casting and are so formed that they will lend themselves upon compression to conform to the braking surface of the drum and will, when under pressure, prevent zones of extremely high pressure. Each shoe includes a web 26 of varying cross section supporting a rim 28 to which is secured a suitable lining 30 adaptable for cooperation with the braking surface of the drum.

The secondary shoe 22 embraces the anchor 14 between the forked end of an operating lever 32 pivoted on the anchor. The operating lever is pivotally connected by a link 34 to the toe of the primary shoe. The lever is preferably arcuate in form and is positioned beneath the primary shoe. The free end of the lever is provided with a hook 36 to which is secured a drag cable 38 connecting the lever to a suitable operating means, not shown.

The primary shoe 20 and the auxiliary shoe 22 are connected by suitable return springs 40 and 42. These springs serve to return the shoes upon release of the brake against an adjustable retractor stop 44 and to retain the shoes when the brake is in the off position in proper spaced relation to the braking surface of the drum.

The crux of the invention is to be found in the friction element and the operating means therefor. In the structure provided the friction element conforms to the drum and thus prevents zones of high pressure. The structure also provides for the transmission of the reaction of the input pressure direct to the anchor to reduce the total thrust on the anchor caused by the load of the secondary shoe thereby eliminating distortion of the anchor.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent, is:

1. A brake comprising an anchor, a backing plate carrying the anchor, a friction element having one end engaging the anchor, an operating member pivoted to the anchor and arranged in the space between the friction element and the backing plate, and a link arranged beside the operating element and connecting the operating member to the other end of the friction element.

2. A brake comprising an anchor, a backing plate carrying the anchor, a friction element including two shoes adjustably connected at their articulated ends, one shoe of the friction element engaging the anchor, an operating member pivoted on the anchor and swinging in the space between the backing plate and the unanchored shoe, and means connecting the operating member to the unanchored shoe of the friction element.

FREDERICK C. FRANK.